(12) United States Patent
Marella et al.

(10) Patent No.: US 8,032,417 B2
(45) Date of Patent: Oct. 4, 2011

(54) METHOD, APPARATUS, AND COMPUTER PROGRAM PRODUCT FOR TRACKING INVENTORY VALUES WITHIN A PLANT

(75) Inventors: Anjan Marella, Morrisville, NC (US);
Joanne O'Lear, Raleigh, NC (US);
William J. Reilly, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 1315 days.

(21) Appl. No.: 11/567,474

(22) Filed: Dec. 6, 2006

(65) Prior Publication Data
US 2008/0140545 A1     Jun. 12, 2008

(51) Int. Cl.
*G06G 1/14* (2006.01)
(52) U.S. Cl. ............... 705/22; 705/7; 705/8; 705/11; 705/16; 705/26; 705/28; 705/29; 705/33; 705/36; 705/37; 706/11; 706/45; 706/46; 706/47
(58) Field of Classification Search .......... 705/22
See application file for complete search history.

(56) References Cited

U.S. PATENT DOCUMENTS

| | | | |
|---|---|---|---|
| 5,920,261 A | 7/1999 | Hughes et al. | |
| 6,049,533 A | 4/2000 | Norman et al. | |
| 6,915,135 B1 | 7/2005 | McKee et al. | |
| 7,082,344 B2 | 7/2006 | Ghaffari | |
| 2002/0133368 A1* | 9/2002 | Strutt et al. | 705/1 |
| 2004/0162768 A1 | 8/2004 | Snyder et al. | |
| 2005/0119950 A1 | 6/2005 | Anderson | |
| 2005/0261975 A1 | 11/2005 | Carver | |
| 2006/0085235 A1 | 4/2006 | Nguyen et al. | |
| 2006/0085296 A1 | 4/2006 | Strickland | |
| 2007/0156536 A1* | 7/2007 | Alfandary et al. | 705/22 |

OTHER PUBLICATIONS

McCausland, Richard. Supply chain management: a big hit: improving the communication lines with vendors and customers can improve the bottom line as well. Accounting Technology, vol. 20, No. 2, p. 14(6), Mar. 2004.*

* cited by examiner

*Primary Examiner* — F. Zeender
*Assistant Examiner* — Fawaad Haider
(74) *Attorney, Agent, or Firm* — Yee & Associates, P.C.; John R. Pivnichny

(57) ABSTRACT

A method, apparatus, and computer program product are disclosed in a computer system for tracking inventory values. Multiple physical storage locations, within a plant, are defined where inventory items can be stored. An indication that an inventory item is being physically moved from a first storage location to a second storage location is received. In response to the receipt of the indication, a financial value of the inventory item is determined and an indication is provided that the financial value was transferred from the first physical storage location to the second physical storage location, wherein the financial value of the inventory item is tracked as the inventory item is physically moved within the plant.

14 Claims, 11 Drawing Sheets

FIG. 11

METHOD, APPARATUS, AND COMPUTER PROGRAM PRODUCT FOR TRACKING INVENTORY VALUES WITHIN A PLANT

BACKGROUND OF THE INVENTION

1. Field of the Invention

The present invention relates generally to a method, apparatus, and computer program product for tracking the financial value of inventory as that inventory is transferred from one physical storage location to another within a single plant.

2. Description of the Related Art

Inventory management systems exist. Some of these systems provide for keeping track of the inventory on hand in one warehouse. If there is an excess of inventory in one warehouse and a shortage of that inventory in another warehouse, some known systems will alert a user that inventory is available in one warehouse that could be transferred to the other warehouse.

Other known systems provide for maintaining information about inventory, such as maintaining a shipping history about the inventory. Some systems track inventory using tags that are affixed to the inventory. These tags indicate the current location of the inventory to which they are affixed.

In current systems, an accounting document is created only when inventory is received at a plant or facility. A single general ledger account exists for all inventory in that plant. When a particular inventory item is received, it is valued by determining a cost for the inventory item. This cost is then posted by posting a financial debit to the single general ledger inventory account. Once inventory has been received, the general ledger account is not updated if, at a later time, this inventory is moved around within the plant.

SUMMARY OF THE INVENTION

A method, apparatus, and computer program product are disclosed in a computer system for tracking inventory values within a plant. Multiple physical storage locations, within a plant, are defined where inventory items can be stored. An indication that an inventory item is being physically moved from a first storage location to a second storage location is received. In response to the receipt of the indication, a financial value of the inventory item is determined and an indication is provided that the financial value was transferred from the first physical storage location to the second physical storage location, wherein the financial value of the inventory item is tracked as the inventory item is physically moved within the plant.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 11 is a graphical depiction of a screen that displays a material document in accordance with the illustrative embodiment.

DETAILED DESCRIPTION OF THE PREFERRED EMBODIMENT

The illustrative embodiment is a method, apparatus, and computer program product for tracking the value of inventory as that inventory is moved around within a plant. Multiple different physical storage locations are defined within a plant. These are different areas within the single plant.

Inventory is typically moved about from one storage location to another. As inventory is moved, the value of the inventory that is currently stored in each location changes. According to the illustrative embodiment, multiple different general ledger inventory accounts are provided. These are referred to herein as "field inventory accounts".

At least one field inventory account is created for each one of the physical storage locations. In some cases, there are multiple different field inventory accounts that are created for a single storage location.

When an inventory item is moved from one storage location to another, the cost of that inventory item is determined. A financial credit of the cost is posted to the field inventory account that is associated with the storage location from which the inventory item was moved, and a financial debit of the cost is posted to the field inventory account that is associated with the storage location to which the inventory item was moved.

As various inventory items are moved around the plant from one storage location to another, the cost of these inventory items is automatically posted to the field inventory accounts that are associated with these storage locations. In this manner, the illustrative embodiment provides for dynamically adjusting the changing value of each storage location within a single plant.

An inventory item can be any type of item. Some examples of an inventory item include: any type of electronic product;

a complete computer system, such as xSer346 3.0 G 2 MB 1 GB/0 HDD, (referred to herein as a "box"); a computer display; a keyboard; a part, such as an adapter, or a cable [referred to herein as "miscellaneous equipment" (MES)], such as a printed circuit board; any type of consumer goods; or any other item that might be moved from one location to another within a single plant.

A "plant" as used herein is typically a single commercial facility. For example, a "plant" can be a building that houses inventory. A single warehouse is a "plant". In addition to housing inventory, other industrial activities, such as manufacturing, might be carried out in a plant.

Prior to describing the illustrative embodiment in detail, data processing systems are described that can be used to implement the illustrative embodiment.

Figure 1:
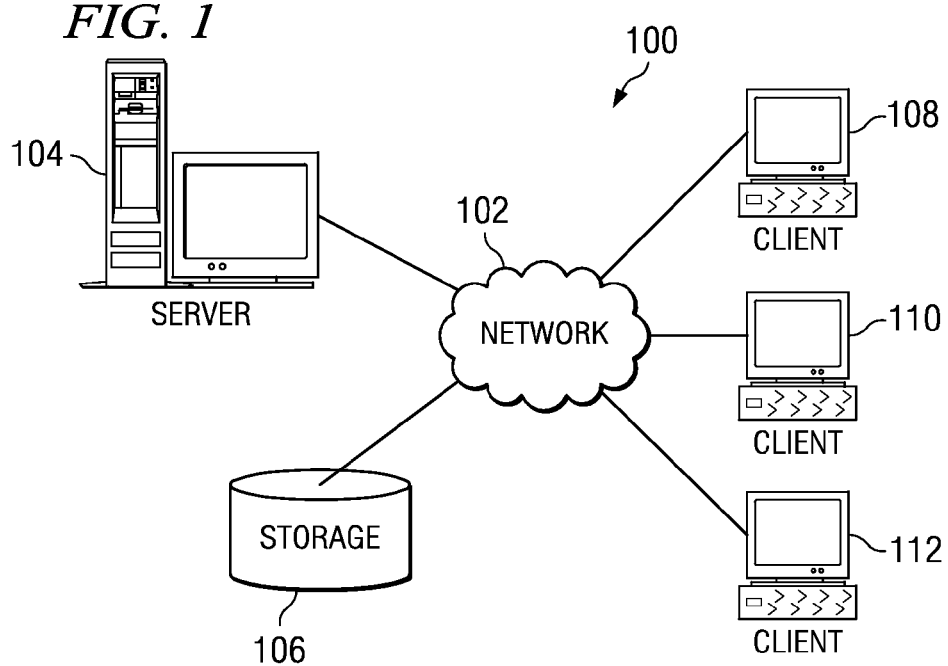
FIG. 1 is a pictorial representation of a network of computer systems that includes the illustrative embodiment.

FIG. 1 is a pictorial representation of a network of computer systems that includes the illustrative embodiment. Network data processing system 100 is a network of computers in which the preferred embodiment may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, a server 104 is connected to network 102 along with storage unit 106. In addition, clients 108, 110, and 112 also are connected to network 102. These clients 108, 110, and 112 may be, for example, personal computers, network computers, or other computing devices. In the depicted example, server 104 provides data, such as boot files, operating system images, and applications, to clients 108-112. Clients 108, 110, and 112 are clients to server 104. Network data processing system 100 may include additional servers, clients, and other devices not shown.

In the depicted example, network data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages.

of course, network data processing system 100 also may be implemented as a number of different types of networks, such as for example, an intranet, a local area network (LAN), a wide area network (WAN), or a wireless network. FIG. 1 is intended as an example, and not as an architectural limitation for the preferred embodiment.

Figure 2:
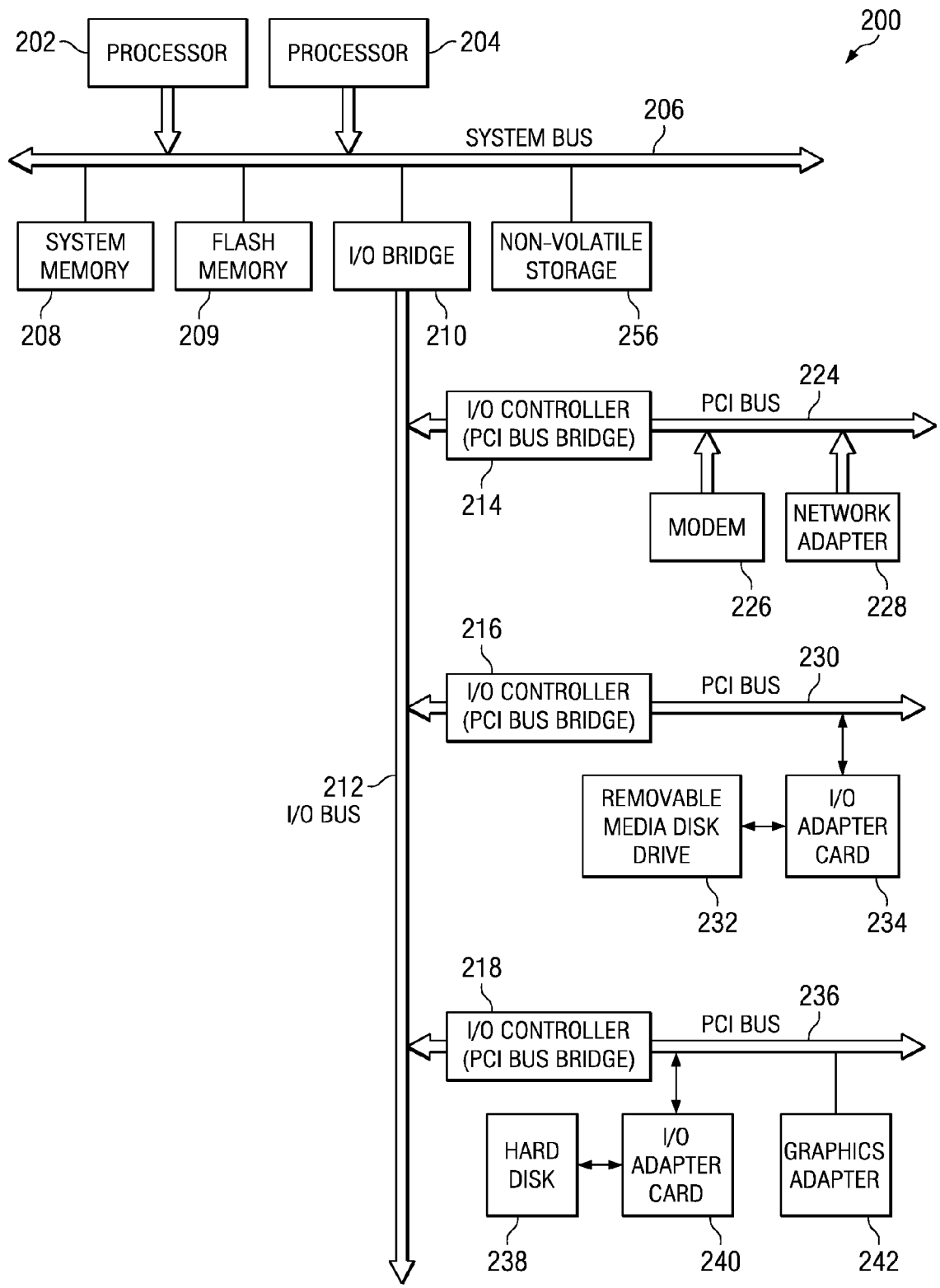
FIG. 2 is a block diagram of a computer system that includes the illustrative embodiment.

FIG. 2 is a block diagram of a computer system that includes the illustrative embodiment. Computer system 200 may be a symmetric multiprocessor (SMP) system including a plurality of processors 202 and 204 connected to system bus 206. Alternatively, a single processor system may be employed. Also connected to system bus 206 are system memory 208, flash memory 209, and non-volatile storage (NV-RAM) 256. I/O bus bridge 210 is connected to system bus 206 and provides an interface to I/O bus 212.

System 200 includes one or more I/O controllers. According to the depicted embodiment, each I/O controller is implemented as a PCI Bus Bridge. Those skilled in the art will recognize that other technologies may be used to implement an I/O controller.

Peripheral component interconnect (PCI) bus bridge 214 connected to I/O bus 212 provides an interface to PCI local bus 224. A number of modems may be connected to PCI bus 224. Typical PCI bus implementations will support four PCI expansion slots or add-in connectors. Communications links to other computers may be provided through modem 226 and network adapter 228 connected to PCI local bus 224 through add-in boards. In this manner, data processing system 200 allows connections to multiple external network computers.

PCI bus bridge 216 is connected to PCI local bus 230. A storage device, such as a media disk drive 232, is included in system 200. A storage device, such as a disk drive 232 capable of receiving removable media, is included in system 200. Removable media includes DVD-ROMs, CD-ROMs, floppy disk, tapes, and other media. Media disk drive 232 is coupled to PCI bus 230 via an I/O adapter card 234.

PCI bus bridge 218 is connected to PCI local bus 236. Another storage device, such as a hard disk drive 238, is included in system 200. Hard disk drive 238 is coupled to PCI bus 236 via an I/O adapter card 240. A memory-mapped graphics adapter 242 may also be connected to I/O bus 236 as depicted.

Figure 3:
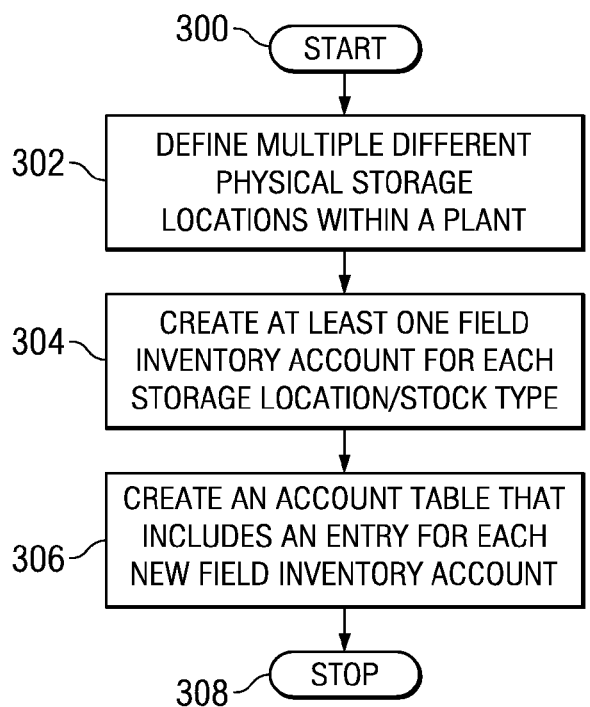
FIG. 3 is a high level flow chart that depicts creating a field inventory account for different storage locations within a plant in accordance with the illustrative embodiment.

FIG. 3 is a high level flow chart that depicts creating a field inventory account for different storage locations within a plant in accordance with the illustrative embodiment. The process starts as illustrated by block 300 and thereafter passes to block 302 which depicts defining multiple different physical storage locations within a plant. These are physical locations within a single plant. Thereafter, block 304 illustrates creating at least one field inventory account for each storage location. For example, a different field inventory account could be created for one storage location for different stock types. Next, block 306 depicts creating an account table that includes an entry for each new field inventory account. The process then terminates as illustrated by block 308.

Figure 4:
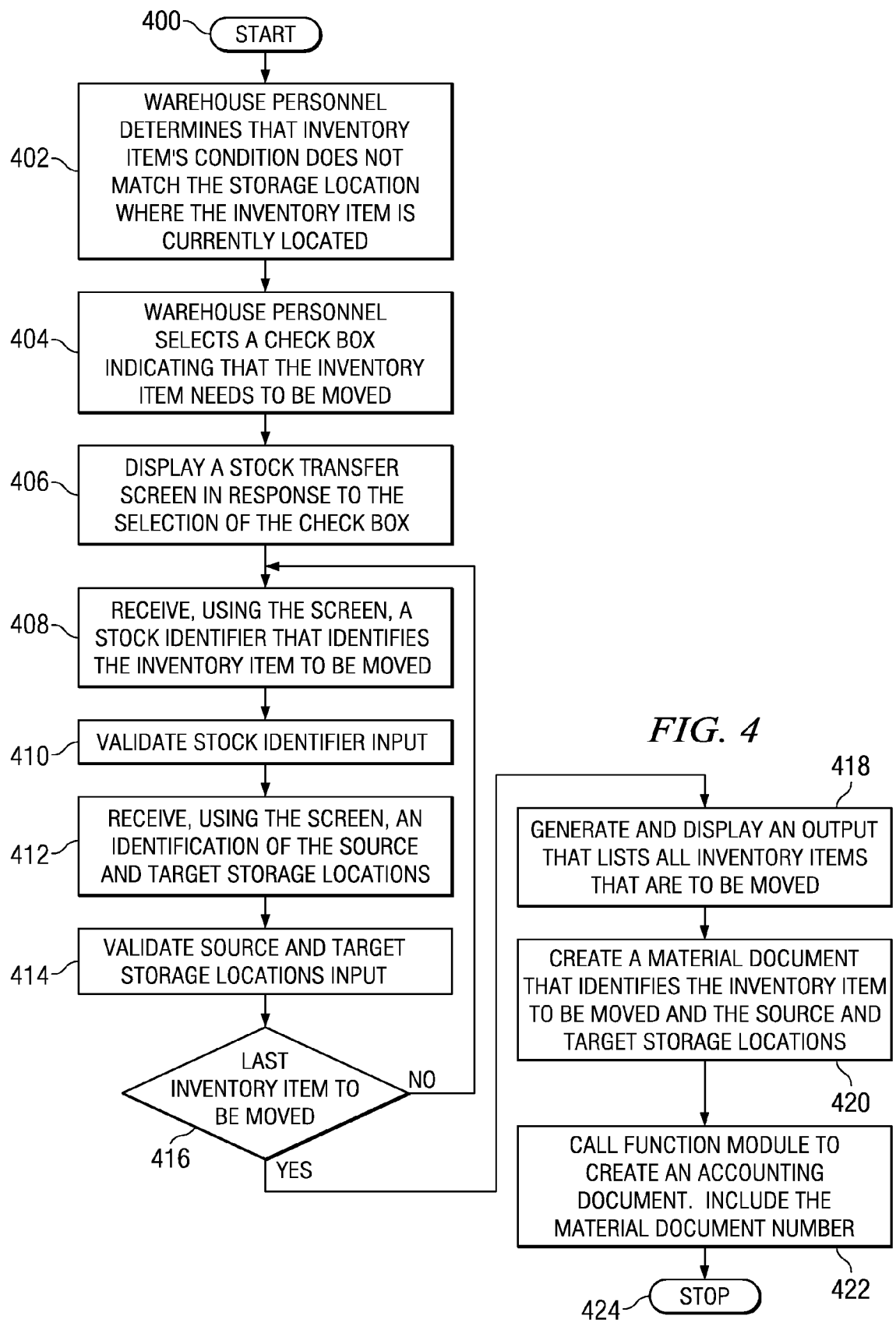
FIG. 4 is a high level flow chart that illustrates identifying an inventory item that is to be moved from one storage location to another within a plant in accordance with the illustrative embodiment.

FIG. 4 is a high level flow chart that illustrates identifying an inventory item that is to be moved from one storage location to another within a plant in accordance with the illustrative embodiment. The process starts as depicted by block 400 and thereafter passes to block 402 which illustrates warehouse personnel determining that an inventory item's condition does not match the storage location where the inventory item is currently located. For example, an inventory item might have been designated as being "new" when it was received in the plant, resulting in the inventory item being placed in the storage location for "new" stock. Warehouse personnel might determine at a later time that the inventory item is really used. The inventory item would then need to be moved from the storage location for new stock to the storage location for used stock.

The process then passes to block 404 which depicts warehouse personnel indicating that an inventory item needs to be moved. This indication could be made by selecting a check box, in a display screen, that indicates that the inventory item needs to be moved from one storage location to another. Thereafter, block 406 illustrates displaying a stock transfer screen in response to the selection of the check box. Next, block 408 depicts receiving, through the stock transfer screen, the stock identifier that identifies the inventory item that needs to be moved. The identifier can be in any form. For example, the identifier might be a scanned material, an option/part, a machine with a serial number, or a batch number.

Next, block 410 illustrates validating the stock identifier input that was received. Block 412 depicts receiving, through the stock transfer screen, an identification of the source and target storage locations. The location where the inventory item is currently located is the source location. The location where the inventory item will be moved is the target location.

Next, block 414 illustrates validating the source and target storage locations. Block 416 depicts a determination of whether or not this is the last inventory item that is to be moved. If a determination is made that this is not the last inventory item that is to be moved, the process passes back to block 408. If a determination is made that this is the last inventory item to be moved, the passes to block 418 which depicts generating and creating an output that lists all inventory items that have been identified to be moved.

The process then passes to block 420 which illustrates creating a material document that identifies the inventory item to be moved and the source and target storage locations. The process of creating a material document is described in more detail with reference to FIG. 5. Block 422 then illustrates calling a function module to create an accounting document. The material document number is included in the call to the function module. The process then terminates as depicted by block 424.

Figure 5:
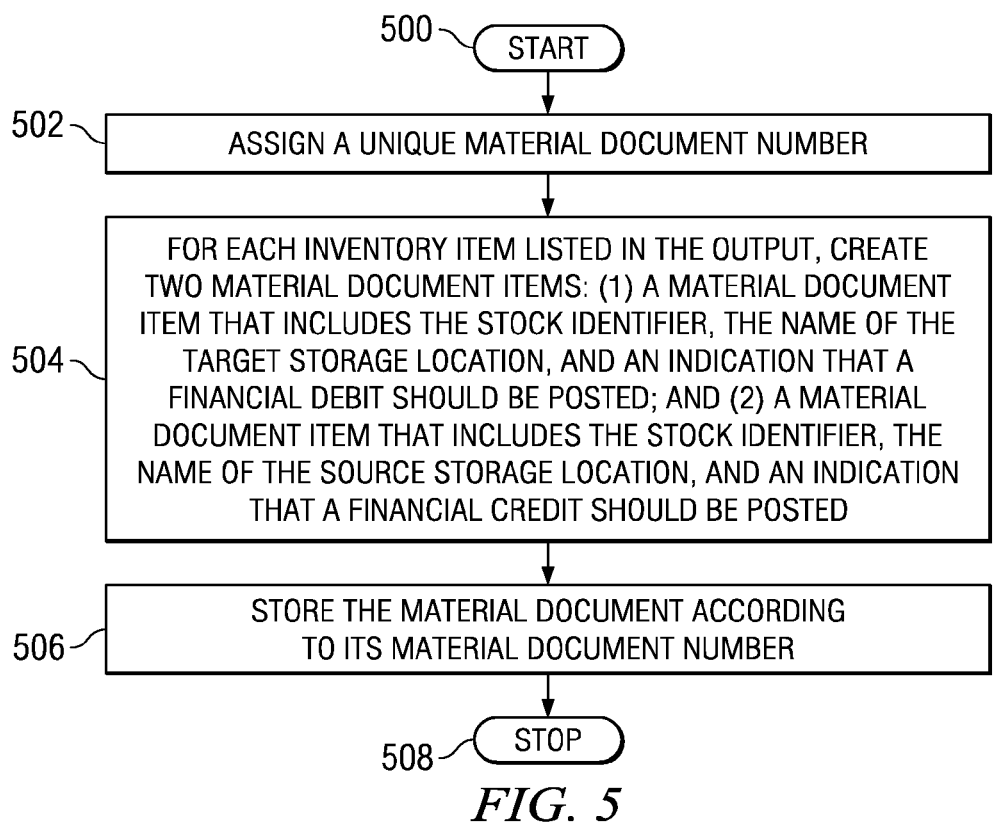
FIG. 5 is a high level flow chart that depicts creating a material document in accordance with the illustrative embodiment.

FIG. 5 is a high level flow chart that depicts creating a material document in accordance with the illustrative embodiment. The process starts as illustrated by block 500 and thereafter passes to block 502 which depicts assigning a unique material document to the material document. Next, block 504 illustrates, for each inventory item listed in the output (see block 418), creating two material document items: (1) a material document item that includes the stock identifier, the target storage location, and an indication that a financial debit should be posted; and (2) a material document item that includes the stock identifier, the source storage location, and an indication that a financial credit should be posted. Thereafter, block 506 depicts storing the material document according to its material document number. The process then terminates as illustrated by block 508.

Figure 6A:
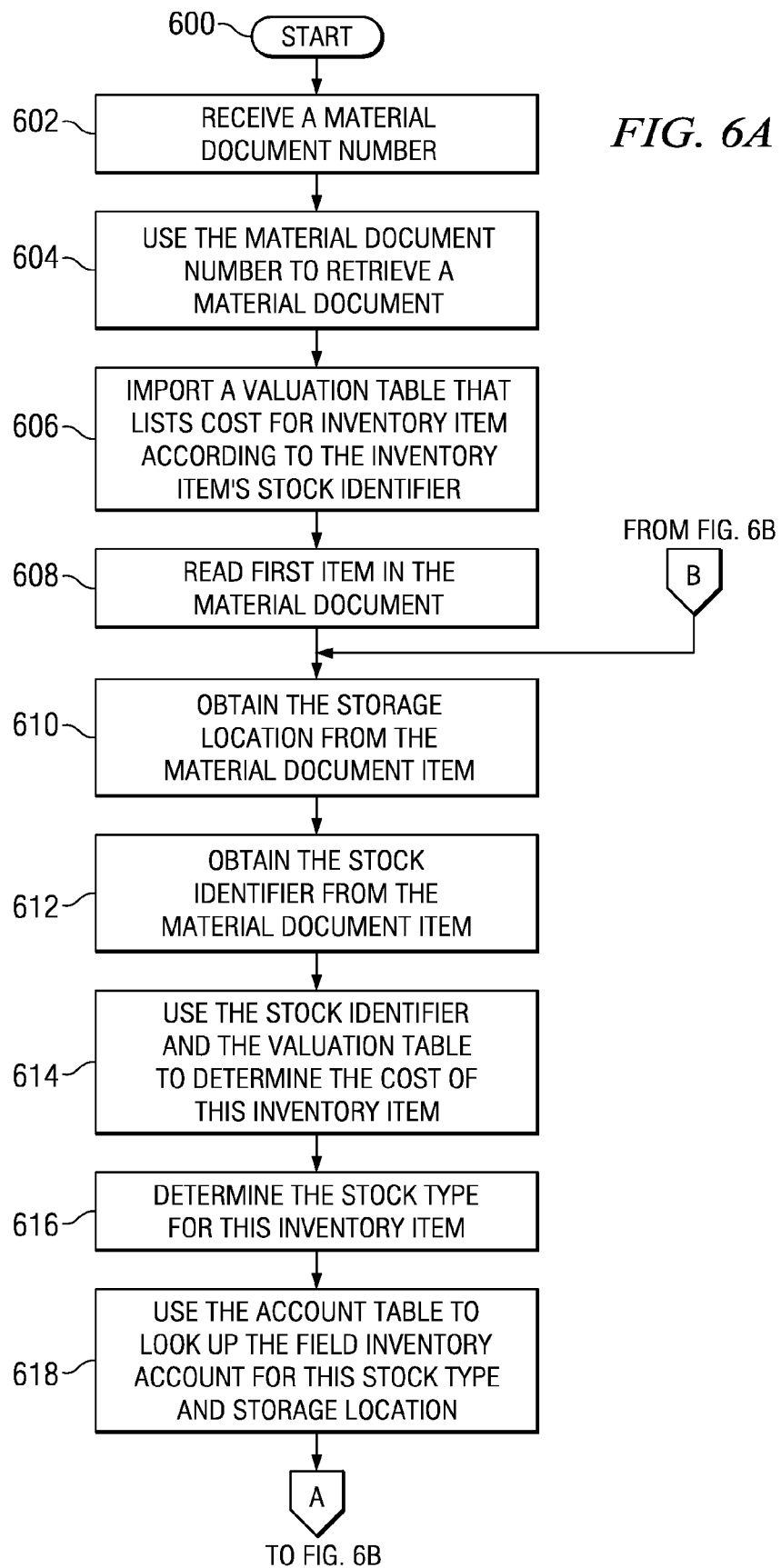
FIGS. 6a and 6b together are a high level flow chart that illustrates a function module process that is used to create an accounting document in response to the movement of an inventory item within a plant from one storage location to another storage location in accordance with the illustrative embodiment.
Figure 6B:
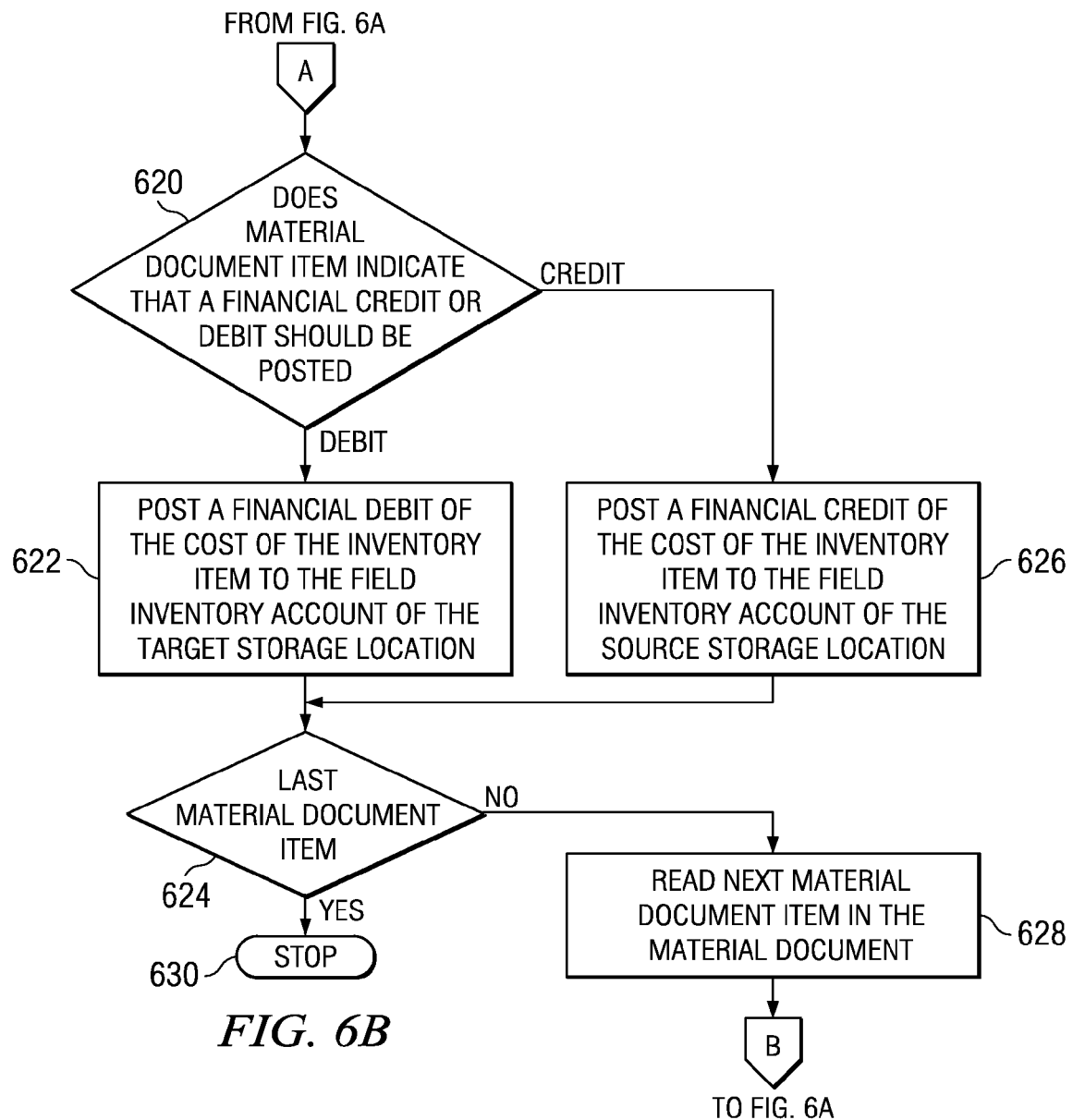

FIGS. 6a and 6b together are a high level flow chart that illustrates a function module process that is used to create an accounting document in response to the movement of inventory items within a plant from one storage location to another storage location in accordance with the illustrative embodiment. The process starts as depicted by block 600 and thereafter passes to block 602 which illustrates receiving a material document number. Next, block 604 depicts using the material document number to retrieve a material document. The process then passes to block 606 which illustrates importing a valuation table that lists cost for each inventory item according to the inventory item's stock identifier.

Next, block 608 illustrates reading the first material document item in the material document. Thereafter, block 610 depicts obtaining the storage locations from the material document item. The process then passes to block 612 which depicts obtaining the stock identifier from the material document item. Block 614 then illustrates using the stock identifier and the valuation table to determine the cost of this inventory item.

The process then passes to block 616 which illustrates determining the stock type for this inventory item. Examples of stock types used herein are "box" and "mes", which is miscellaneous equipment. Next, block 618 depicts using the account table to look up the field inventory account for this stock type and storage location. The process then passes to block 620 which depicts a determination of whether or not the material document item indicates that a financial credit or financial debit should be posted.

If a determination is made that this material document item indicates that a financial debit should be posted, the process passes to block 622 which illustrates posting a financial debit of the cost of the inventory item to the field inventory account of the target storage location. The process then passes to block 624.

Referring again to block 620, if a determination is made that this material document item indicates that a financial credit should be posted for this material document, the process passes to block 626 which illustrates posting a financial credit of the cost of the inventory item to the field inventory account of the source storage location. The process then passes to block 624.

Block 624 depicts a determination of whether or not this is the last material document item in the material document. If a determination is made that this is not the last material document item, the process passes to block 628 which illustrates reading the next material document item in the material document. The process then passes back to block 610. Referring again to block 624, if a determination is made that this is the last material document item, the process terminates as depicted by block 630.

Figure 7:
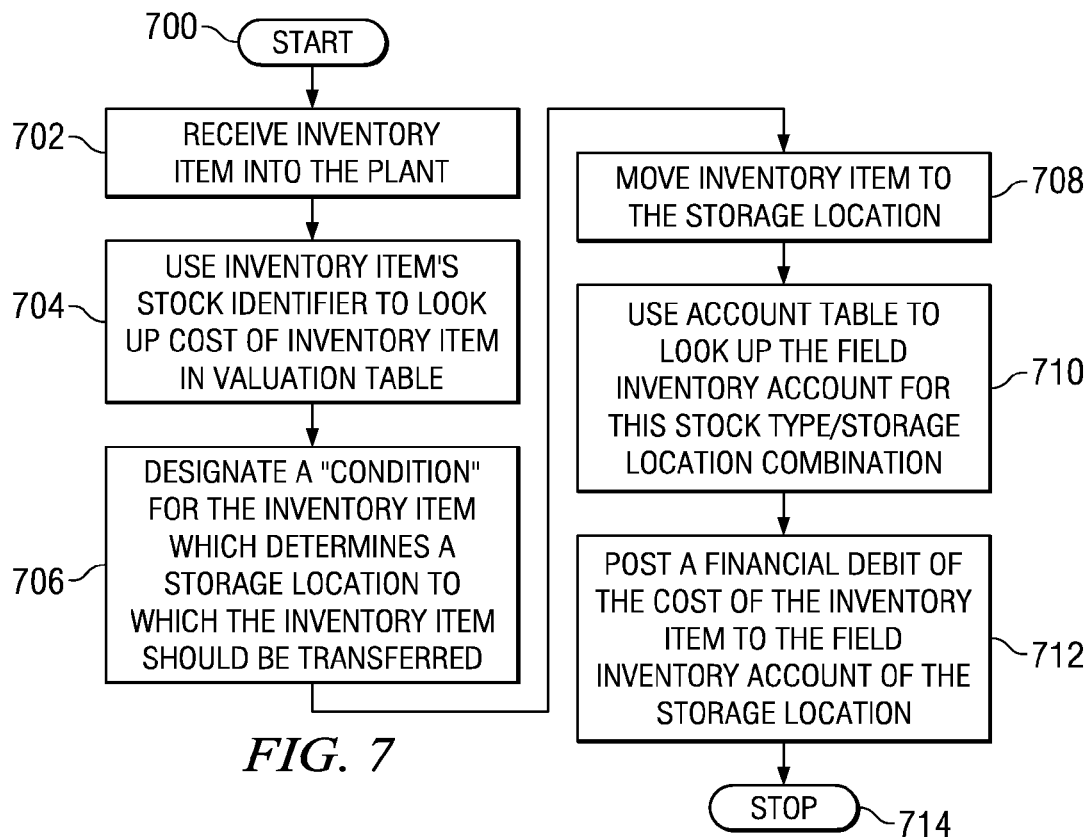
FIG. 7 is a high level flow chart that illustrates designating the condition of inventory items received into a plant and then moving the inventory item to the appropriate storage location in accordance with the illustrated embodiment.

FIG. 7 is a high level flow chart that illustrates designating the condition of an inventory item received into a plant and then moving the inventory item to the appropriate storage location in accordance with the illustrated embodiment. The process starts as depicted by block 700 and thereafter passes to block 702 which illustrates receiving an inventory item into a plant. Next, block 704 depicts using the inventory item's stock identifier to look up the cost of the inventory item in a valuation table.

The process then passes to block 706 which illustrates designating a "condition" for the inventory item. For example, the inventory item's condition might be determined to be new, used, or some other condition. There is a storage location that is associated with each condition. The condition determines a storage location to which the inventory item should be moved. Next, block 708 depicts moving the inventory item to the physical storage location that is associated with the designated condition.

Block 710 then illustrates using the account table to look up the field inventory account for this stock type and storage location. Next, block 712 depicts posting a financial debit of the cost of the inventory item to the field inventory account of the storage location. The process then terminates as illustrated by block 714.

Figure 8:
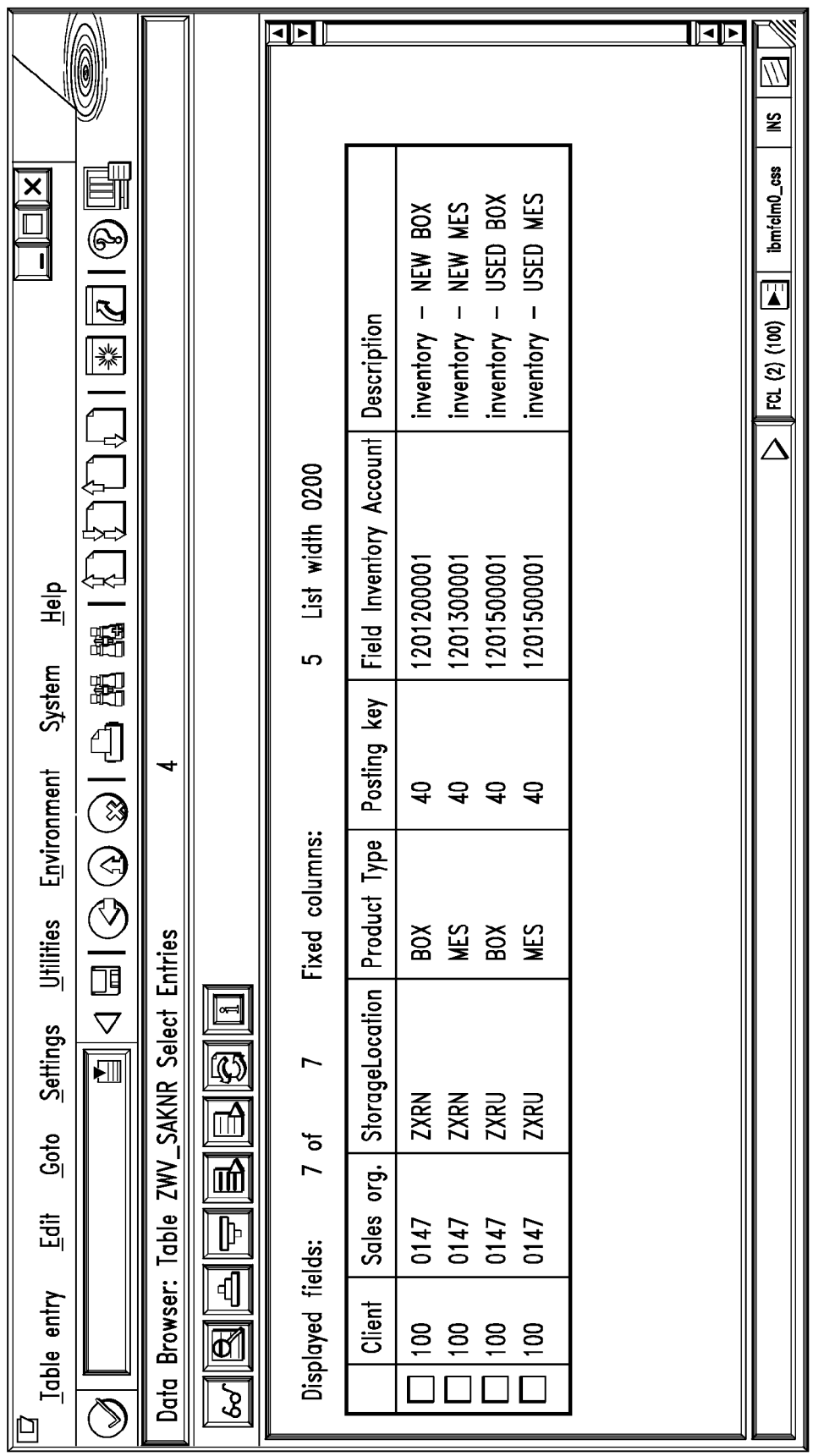
FIG. 8 is a graphical depiction of a screen that includes an account table in accordance with the illustrative embodiment.

FIG. 8 is a graphical depiction of a screen that includes an account table in accordance with the illustrative embodiment. The account table indicates that there are two different physical storage locations in the plant: ZXRN and ZXRU. There are two different types of stock: a box (BOX) and miscellaneous equipment (MES). An inventory item may be designated as either being "new" or "used". Inventory items that are designated as being "new" should be stored in the ZXRN storage location, and inventory items that are designated as being "used" should be in the ZXRU storage location.

Three different field inventory general ledger accounts have been created, two for the ZXRN storage location and one for the ZXRU storage location.

Figure 9:
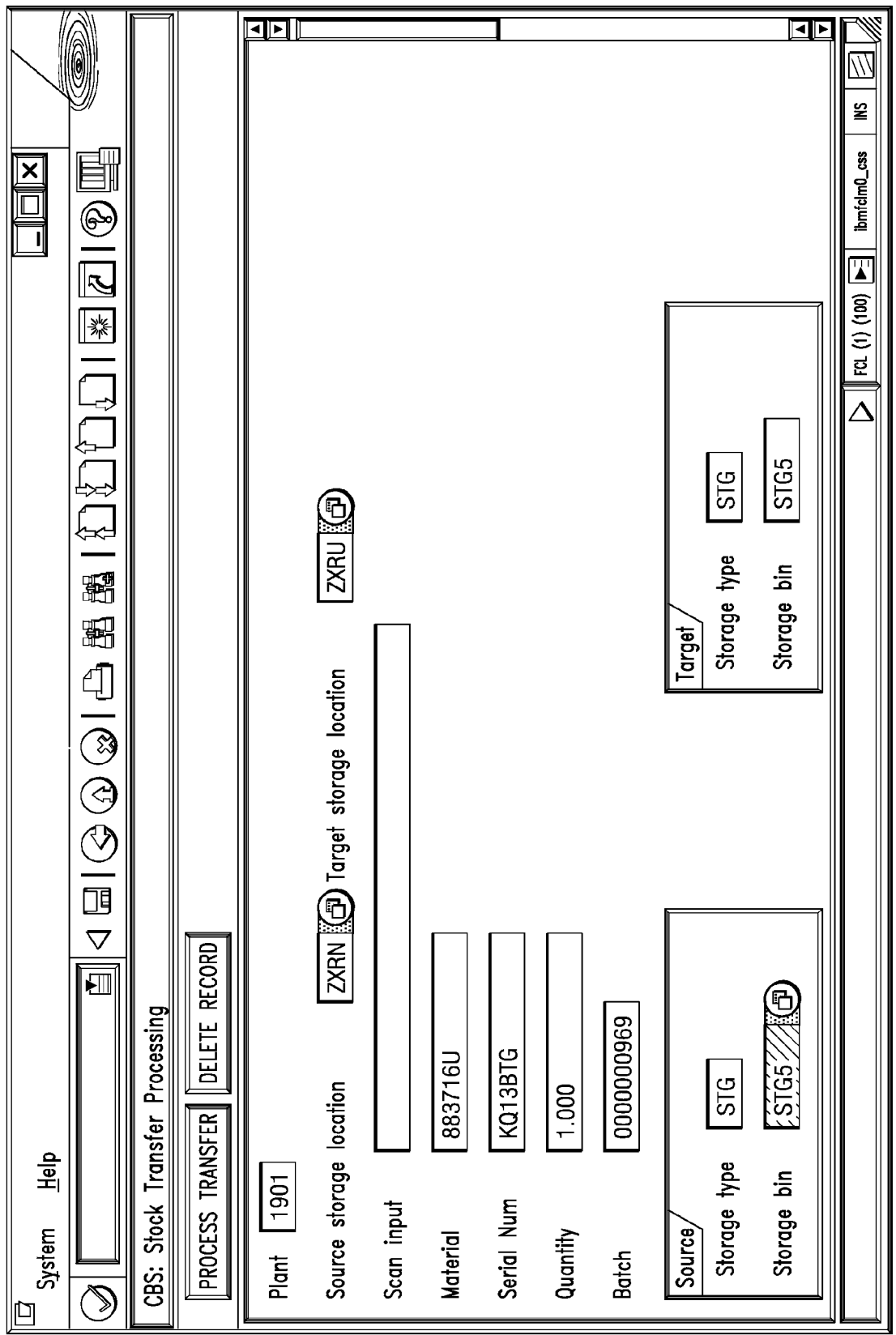
FIG. 9 is a graphical depiction of a stock transfer screen in accordance with the illustrative embodiment.

FIG. 9 is a graphical depiction of a stock transfer screen in accordance with the illustrative embodiment. The screen includes a field for entering a plant number of the plant that includes the physical storage locations. Fields are also provided where an identification of the source and target storage locations can be entered.

In the example depicted by FIG. 9, it has been determined that an inventory item that is currently in the location for new stock is really used and should be moved to the storage location for used stock. Therefore, "ZXRN" has been entered in the source storage location field, and "ZXRU" has been entered in the target storage location field.

The inventory item that is to be moved has been identified in the material, serial number, and batch fields. A quantity has been entered. Additional information can be entered, such as the storage type and storage bin. A material and serial number are stored within a batch based on characteristics. If the machines have the same features, such as the model, an adapter, or cables, then the machines will be in the same batch.

Figure 10:
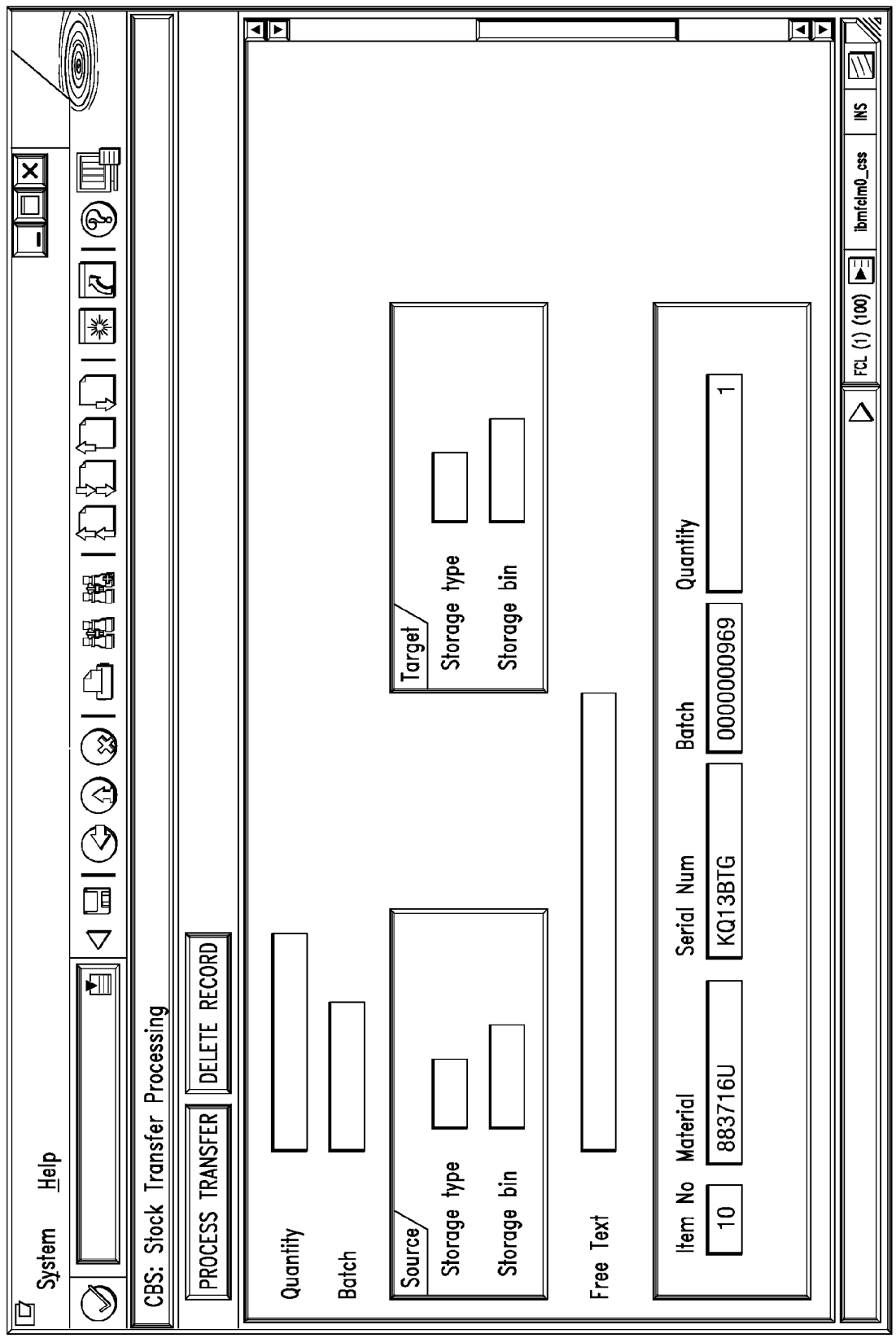
FIG. 10 is a graphical depiction of the bottom portion of the stock transfer screen of FIG. 9 after having scrolled to the bottom of the screen in accordance with the illustrative embodiment.

FIG. 10 is a graphical depiction of the bottom portion of the stock transfer screen of FIG. 9 after having scrolled to the bottom of the screen in accordance with the illustrative embodiment. After the information has been entered into the top portion of the stock transfer screen, the bottom portion of the screen displays an output which identifies the particular inventory item that is being moved from the source storage location to the target storage location.

Figure 11:
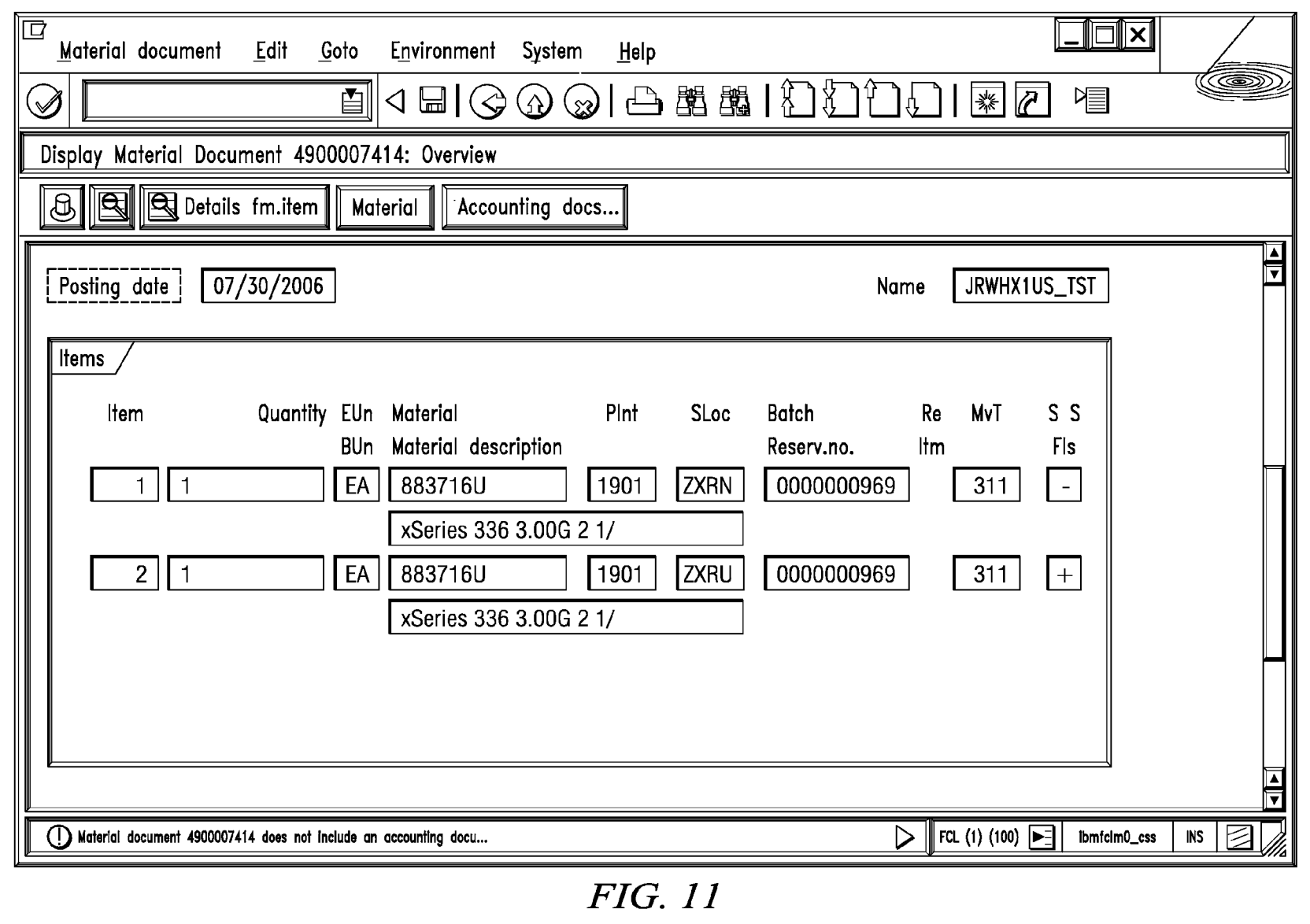

FIG. 11 is a graphical depiction of a screen that displays a material document in accordance with the illustrative embodiment. Once the information has been entered into the stock transfer screen, the output displayed, and the information confirmed by a user, a material document is created. An example material document is depicted by FIG. 11. This material document was created after the screen depicted by FIG. 9 was completed.

A material document item is created that includes the unique storage identifier that identifies the inventory item that is being moved, the source storage location name, and an indication that a financial credit should be posted. Another material document item is created that includes the unique storage identifier that identifies the inventory item that is being moved, the target storage location name, and an indication that a financial debit should be posted.

The material document of FIG. 11 was assigned a material document number 4900007414. This material document can be retrieved using this material document number.

Material document item 1 of this material document includes an identifier "883716U" that identifies the inventory item that is being moved, a storage location name "ZXRN", and an indication, "−", that a financial credit should be posted. Identifier "883716U" can also be used to determine that this inventory item is a "BOX".

Material document item 2 includes an identifier "883716U" that identifies the inventory item that is being moved, a storage location name "ZXRU", and an indication, "+", that a financial debit should be posted.

Figure 12:
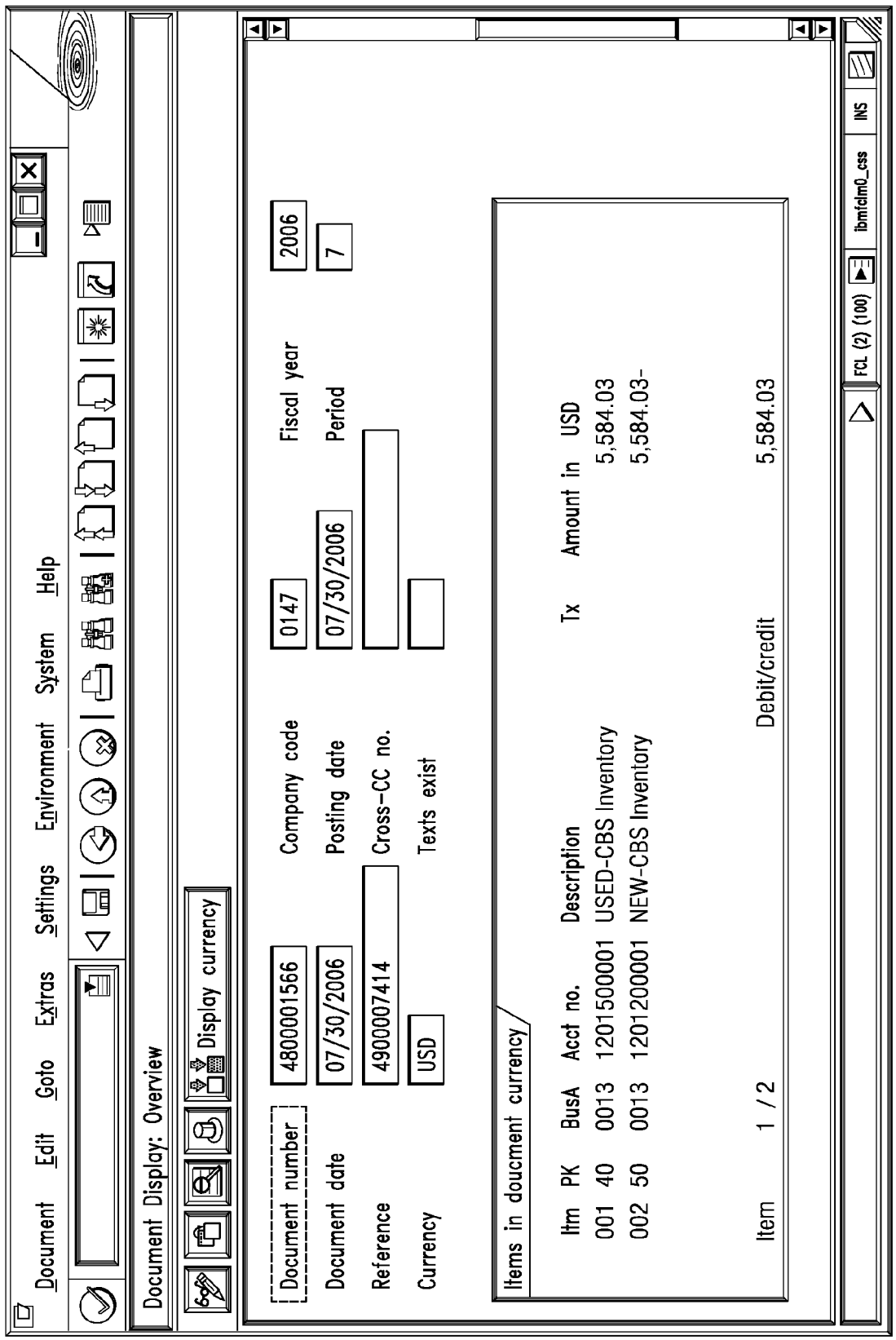
FIG. 12 is a graphical depiction of a screen that illustrates an accounting document that includes financial postings in accordance with the illustrative embodiment.

FIG. 12 is a graphical depiction of a screen that illustrates an accounting document that includes the financial postings that resulted after the material document depicted by FIG. 11 was created in accordance with the illustrative embodiment.

A material document number is used when creating financial postings. The material document number 4900007414 is used to create financial postings associated with movement of inventory item(s) listed in the document.

To create financial postings for this material document, a valuation table is imported that lists the cost for each inventory item according to each inventory item's storage identifier.

Next, the first material document item is read. The name of the storage location and the storage identifier are obtained from that inventory item. The stock identifier is used as an index into the valuation table to retrieve the cost for this inventory item. The cost for this inventory item is determined to be $5584.03.

A stock type for this inventory item is also determined. In this case the stock type "BOX" was determined.

The account table, such as depicted by FIG. 8, is then used to look up the field inventory account for this stock type and storage location. The storage location indicated by material document item 1 is ZXRN. The account table of FIG. 8 lists a field inventory account of "1201200001" for the storage location "ZXRN" for a "BOX". It is also determined that a financial credit should be posted. Therefore, FIG. 12 depicts a financial credit of $5584.03 that was posted to field inventory account 1201200001.

The second material document item is read. The name of the storage location and the storage identifier are obtained from that inventory item. The stock identifier is used as an index into the valuation table to retrieve the cost for this inventory item. The cost for this inventory item is determined to be $5584.03. A stock type for this inventory item is also determined. In this case the stock type "BOX" was determined. It is also determined that a financial debit should be posted.

The account table, such as depicted by FIG. 8, is then used to look up the field inventory account for this stock type and storage location. The storage location indicated by material document item 2 is ZXRU. The account table of FIG. 8 lists a field inventory account of "1201500001" for the storage location "ZXRU" for a BOX. Since material document item 2 indicates that a financial debit should be posted to this account, FIG. 12 depicts a financial debit of $5584.03 that was posted to field inventory account 1201500001.

The illustrative embodiment provides many advantages over the prior art. The illustrative embodiment provides for lower level financial reporting which allows for better auditing. Because the illustrative embodiment provides lower level physical movement tracking, there is better inventory management, and better decisions can be made for inventory dispositions. Inventory costs can be adjusted at a lower level. Inventory costs can be tracked at a more specific physical location, i.e. a storage location. More discrete depreciation methods can be used for the inventory.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a computer system for tracking inventory values, said method comprising the steps of:
defining a plurality of physical storage locations where inventory items can be stored, wherein the plurality of physical storage locations are within a plant;
receiving a source location identification in a source field and a destination location identification in a target field, wherein the source field and the target field are displayed in a first particular screen that is displayed using a graphical user interface, and wherein the source location identification identifies a first one of said plurality of physical storage locations and the destination location identification identifies a second one of said plurality of physical storage locations;
receiving an inventory item identification in at least one inventory item field in the first particular screen, wherein an inventory item that is identified by the inventory item identification is being physically moved from the first one of said plurality of physical storage locations to the second one of said plurality of physical storage locations;
in response to said receipt of said source location identification, said destination location identification, and said inventory item identification, indicating that a financial value of said inventory item was transferred from said first one to said second one of said plurality of physical storage locations, wherein said financial value of said inventory item is tracked as said inventory item is physically moved within said plant;
receiving said inventory item into said plant;
determining that said inventory item should be moved to said first one of said plurality of physical storage locations;
identifying a financial ledger account that is associated with said first one of said plurality of physical storage locations;
posting a financial debit of said financial value to said financial ledger account;
in response to receiving said source location identification, said destination location identification, and said inventory item identification: generating a material document that includes a first item that indicates that the inventory item has been removed from the first one of the plurality of physical storage locations and a second item that indicates that the inventory item has been moved into the second one of the plurality of physical storage locations; and
displaying said material document in a material document screen using said graphical user interface;
using said material document to generate financial postings, wherein the first item is used to determine that a financial debit should be posted to the ledger account that is associated with said first one of said plurality of physical storage locations and a financial credit should be posted to a ledger account that is associated with said second one of said plurality of physical storage locations; and
displaying said financial postings in an accounting document screen that is displayed using the graphical user interface.

2. The method according to claim 1, further comprising:
in response to said receipt of said source location identification, said destination location identification, and said inventory item identification, generating a financial document that includes an identification of said inventory item and said financial value.

3. The method according to claim 1, further comprising:
posting said financial value to a ledger.

4. The method according to claim 1, further comprising:
for each one of said plurality of physical storage locations, creating at least one ledger account;
creating two different particular ledger accounts for a third one of said plurality of physical storage locations;
displaying the at least one ledger account and the two different particular ledger accounts in a second particular screen using the graphical user interface; and
for each one of said plurality of physical storage locations, indicating a total value of all inventory items, which are stored in one of said plurality of physical storage locations, in said at least one ledger account that was created for said one of said plurality of physical storage locations.

5. The method according to claim 1, further comprising:
creating a first ledger account for said first one of said plurality of physical storage locations, said first ledger account indicating a total financial value of all inventory items that are stored in said first one of said plurality of physical storage locations;
creating a second ledger account for said second one of said plurality of physical storage locations, said second ledger account indicating a total financial value of all inventory items that are stored in said second one of said plurality of physical storage locations; and
in response to said receipt of said source location identification, said destination location identification, and said inventory item identification, posting a financial debit to said first ledger account of said financial value and posting a financial credit to said second ledger account of said financial value.

6. The method according to claim 1, further comprising:
creating a plurality of ledger accounts, each one of said plurality of ledger accounts associated with each one of said plurality of physical storage locations;
displaying said plurality of ledger accounts in an accounts screen that is displayed using the graphical user interface;
in response to said receipt of said source location identification and said destination location identification:

identifying one of said plurality of ledger accounts that is associated with said first one of said plurality of physical storage location; and identifying one of said plurality of ledger accounts that is associated with said second one of said plurality of physical storage location.

7. A computer program product comprising:

a computer usable medium including computer usable program code for tracking inventory values, said computer program product including:

computer usable program code for defining a plurality of physical storage locations where inventory items can be stored wherein the plurality of physical storage locations are within a plant;

computer usable program code for receiving a source location identification in a source field and a destination location identification in a target field, wherein the source field and the target field are displayed in a first particular screen that is displayed using a graphical user interface, and wherein the source location identification identifies a first one of said plurality of physical storage locations and the destination location identification identifies a second one of said plurality of physical storage locations;

computer usable program code for receiving an inventory item identification in at least one inventory item field in the first particular screen, wherein an inventory item that is identified by the inventory item identification is being physically moved from the first one of said plurality of physical storage locations to the second one of said plurality of physical storage locations;

in response to said receipt of said source location identification, said destination location identification, and said inventory item identification, computer usable program code for indicating that a financial value of said inventory item was transferred from said first one to said second one of said plurality of physical storage locations, wherein said financial value of said inventory item is tracked as said inventory item is physically moved within said plant;

computer usable program code for receiving said inventory item into said plant;

computer usable program code for determining that said inventory item should be moved to said first one of said plurality of physical storage locations;

computer usable program code for identifying a financial ledger account that is associated with said first one of said plurality of physical storage locations;

computer usable program code for posting a financial debit of said financial value to said financial ledger account.

in response to receiving said source location identification, said destination location identification, and said inventory item identification: computer usable program code for generating a material document that includes a first item that indicates that the inventory item has been removed from the first one of the plurality of physical storage locations and a second item that indicates that the inventory item has been moved into the second one of the plurality of physical storage locations; and computer usable program code for displaying said material document in a material document screen using said graphical user interface;

computer usable program code for using said material document to generate financial postings, wherein the first item is used to determine that a financial debit should be posted to the ledger account that is associated with said first one of said plurality of physical storage locations and a financial credit should be posted to a ledger account that is associated with said second one of said plurality of physical storage locations; and computer usable program code for displaying said financial postings in an accounting document screen that is displayed using the graphical user interface.

8. The computer program product according to claim 7, further comprising:

in response to said receipt of said source location identification, said destination location identification, and said inventory item identification, computer usable program code for generating a financial document that includes an identification of said inventory item and said financial value.

9. The computer program product according to claim 7, further comprising:

computer usable program code for posting said financial value to a ledger.

10. The computer program product according to claim 7, further comprising:

for each one of said plurality of physical storage locations, computer usable program code for creating at least one ledger account;

creating two different particular ledger accounts for a third one of said plurality of physical storage locations;

computer usable program code for displaying the at least one ledger account and the two different particular ledger accounts in a second particular screen using the graphical user interface; and for each one of said plurality of physical storage locations, computer usable program code for indicating a total value of all inventory items, which are stored in one of said plurality of physical storage locations, in said at least one ledger account that was created for said one of said plurality of physical storage locations.

11. The computer program product according to claim 7, further comprising:

computer usable program code for creating a first ledger account for said first one of said plurality of physical storage locations, said first ledger account indicating a total financial value of all inventory items that are stored in said first one of said plurality of physical storage locations;

computer usable program code for creating a second ledger account for said second one of said plurality of physical storage locations, said second ledger account indicating a total financial value of all inventory items that are stored in said second one of said plurality of physical storage locations; and in response to said receipt of said source location identification, said destination location identification, and said inventory item identification, computer usable program code for posting a financial debit to said first ledger account of said financial value and posting a financial credit to said second ledger account of said financial value.

12. The computer program product according to claim 7, further comprising:

computer usable program code for creating a plurality of ledger accounts, each one of said plurality of ledger accounts associated with each one of said plurality of physical storage locations;

computer usable program code for displaying said plurality of ledger accounts in an accounts screen that is displayed using the graphical user interface;

in response to said receipt of said source location identification and said destination location identification:

computer usable program code for identifying one of said plurality of ledger accounts that is associated with said first one of said plurality of physical storage location; and computer usable program code for identifying one of said plurality of ledger accounts that is associated with said second one of said plurality of physical storage location.

13. An apparatus in a computer system, which includes a CPU, for tracking inventory values, said apparatus comprising:

a display;

said CPU executing code for defining a plurality of physical storage locations where inventory items can be stored, wherein the plurality of physical storage locations are within a plant;

said CPU executing code for receiving a source location identification in a source field and a destination location identification in a target field, wherein the source field and the target field are displayed in a first particular screen that is displayed using a graphical user interface, and wherein the source location identification identifies a first one of said plurality of physical storage locations and the destination location identification identifies a second one of said plurality of physical storage locations;

said CPU executing code for receiving an inventory item identification in at least one inventory item field in the first particular screen, wherein an inventory item that is identified by the inventory item identification is being physically moved from the first one of said plurality of physical storage locations to the second one of said plurality of physical storage locations;

in response to said receipt of said source location identification, said destination location identification, and said inventory item identification, said CPU executing code for indicating that a financial value of said inventory item was transferred from said first one to said second one of said plurality of physical storage locations, wherein said financial value of said inventory item is tracked as said inventory item is physically moved within said plant.

said CPU executing code for receiving said inventory item into said plant;

said CPU executing code for determining that said inventory item should be moved to said first one of said plurality of physical storage locations;

said CPU executing code for identifying a financial ledger account that is associated with said first one of said plurality of physical storage locations;

said CPU executing code for posting a financial debit of said financial value to said financial ledger account;

in response to receiving said source location identification, said destination location identification, and said inventory item identification: said CPU executing code for generating a material document that includes a first item that indicates that the inventory item has been removed from the first one of the plurality of physical storage locations and a second item that indicates that the inventory item has been moved into the second one of the plurality of physical storage locations; and said CPU executing code for displaying said material document in a material document screen using said graphical user interface;

using said material document to generate financial postings, wherein the first item is used to determine that a financial debit should be posted to the ledger account that is associated with said first one of said plurality of physical storage locations and a financial credit should be posted to a ledger account that is associated with said second one of said plurality of physical storage locations; and displaying said financial postings in an accounting document screen that is displayed using the graphical user interface.

14. The apparatus according to claim 13, further comprising:

in response to said receipt of said source location identification, said destination location identification, and said inventory item identification:

said CPU executing code for generating financial postings, wherein the first item is used to determine that a financial debit should be posted to a ledger account that is associated with said first one of said plurality of physical storage locations and a financial credit should be posted to a ledger account that is associated with said second one of said plurality of physical storage locations; and said CPU executing code for displaying said financial postings in an accounting document screen that is displayed using the graphical user interface.

* * * * *